(No Model.)
O. HENRY.
CHURN.
No. 292,915. Patented Feb. 5, 1884.
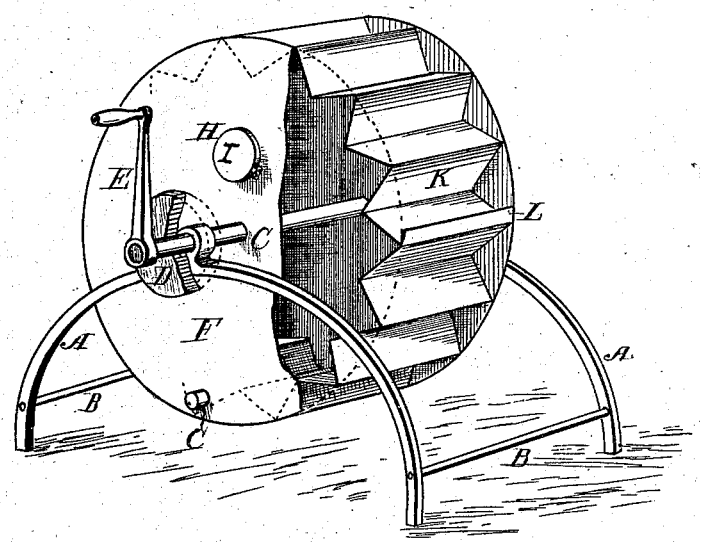
WITNESSES:
H. J. Harrop.
O. H. Bailey
INVENTOR:
Orrin Henry
By J. L. Berk
Attorney.

UNITED STATES PATENT OFFICE.

ORRIN HENRY, OF PORT ANDREW, WISCONSIN.

CHURN.

SPECIFICATION forming part of Letters Patent No. 292,915, dated February 5, 1884.

Application filed July 2, 1883. (No model.)

*To all whom it may concern:*

Be it known that I, ORRIN HENRY, of Port Andrew, in the county of Richland and State of Wisconsin, have invented a new and useful Improvement in Churns, which improvement is fully set forth in the following specification and accompanying drawing, in which the figure is a perspective view, partly in section, of my rotary bucket churn.

The object of the present invention is to provide a rotary churn so arranged that the inner side of the periphery of the body acts as an agitator when the body is rotated. The outer surface of the periphery is adapted in the form of a breast or overshot wheel, so that motion may be produced by means of water; or, if desired, the same form can be arranged for animal power. Provision is also made in the way of a crank and pulley for applying hand or other power, all of which will now be set forth in detail.

In the accompanying drawing, A represents one of the side pieces, standards, or legs, preferably of a semicircular form, and the ends, with the convex side up, resting on the floor and of sufficient size for the purpose. Two of these pieces, similarly constructed and placed a suitable distance apart, are designed to receive the rotary churn-body. The two side pieces are supported at a suitable distance apart by the transverse piece B, securely fixed to the pieces A. In the center, and at the highest part of these side pieces, is journaled the transverse shaft C. On the outer side of one of the journal-boxes the shaft C is provided with a pulley, D, for the use of a belt, in case it is desired to use power. On the end of the shaft provision is also made for a crank, E, in order to manipulate it in that manner, if desirable. The circular galvanized-iron disks or cylinder-heads F are rigidly secured to the shaft C. One of these disks is provided with a circular opening for the purpose of drawing off the buttermilk, and which may be closed by means of a plug or cork. On the opposite side of the shaft C from the opening G, and at a little distance from the shaft, is a circular opening, H, for introducing the cream, removing the butter, or for the purpose of cleaning the interior of the churn. A suitable lid, I, is used for the purpose of closing the same. The body or circumference of the cylinder is formed with corrugations or steps K. These corrugations can be of any convenient angle. When tread-power is desired to be used, a frame can be placed over the churn to secure the dog. When water-power is desired to be used, the outer part of the corrugations L can be turned up, which forms buckets for the reception of water. By this means the water can be applied either as an overshot or as a breast wheel. When motive power is applied to the churn either by hand, power, tread, or water, the cream dashing on the inner angles of the corrugations serves the purpose of dashers, and succeeds effectually in breaking the cream-globules and releasing the butter therefrom.

I recognize the fact that there are washing-machines provided with a corrugated revolving cylinder having fluted corrugated balls within, so that in whatever way the cylinder is turned the corrugations of said balls fit in the corrugations of the cylinder; but I am not aware that there are machines in which the corrugations on the inner surface of the periphery act alone and independent of any fluted or corrugated balls in agitating the cream.

I am cognizant of the fact that there are machines provided with a perforated cylinder, and a flue connecting with a reservoir and the cylinder by means of valves; but, as will readily be observed, I do not lay claim to any of these features of invention.

I am aware that there are cylindrical churns provided on their inner side with transverse bars equidistant from each other and secured to the sides of the machine to act as dashers; but my invention makes provision only for dashers in the shape of corrugations on the inner surface of the periphery.

What I claim as new is—

In a churn, the rotating body composed of the disks or ends F, provided with suitable openings at one end, as shown, in combination with the step-like or corrugated periphery K, having the turned-up blades L, to form buckets, whereby water-power may be applied to rotate the same, substantially as herein set forth.

In testimony that I claim the foregoing I have hereunto set my hand, this 23d day of February, 1883, in the presence of witnesses.

ORRIN HENRY.

Witnesses:
NATHAN MILLER,
JOHN R. CARVER.